Jan. 15, 1935.  J. R. BATTLE  1,988,152
LUBRICATOR
Filed June 26, 1929  2 Sheets-Sheet 1

Inventor
John R. Battle,
By Clifton C. Hallowell
Attorney

Jan. 15, 1935. J. R. BATTLE 1,988,152
LUBRICATOR
Filed June 26, 1929 2 Sheets-Sheet 2
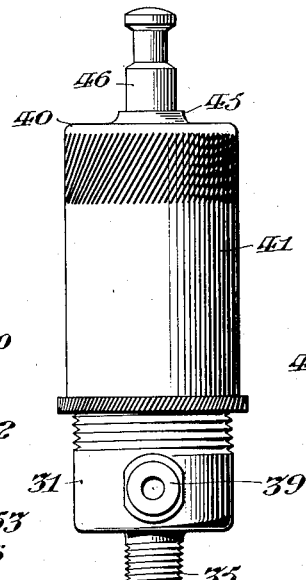
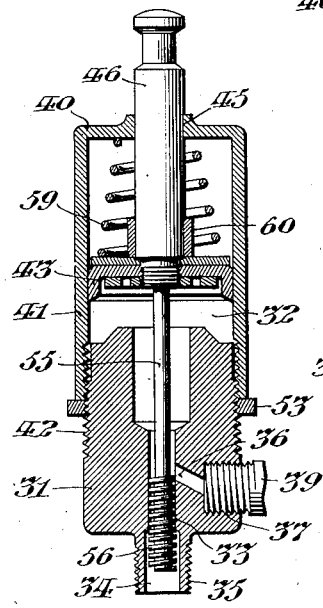
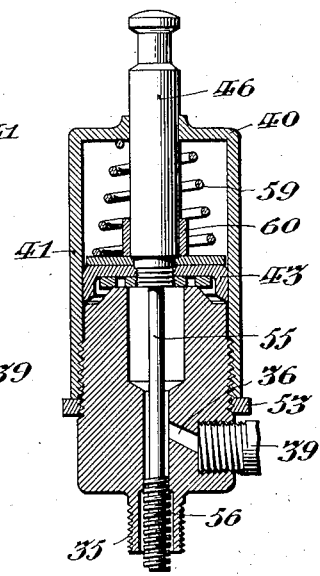
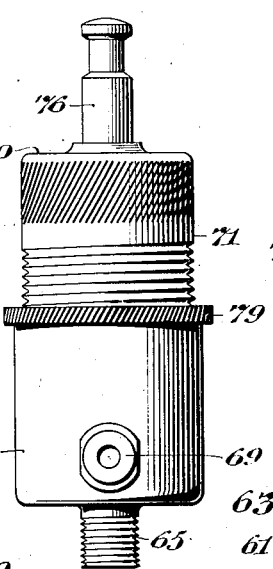
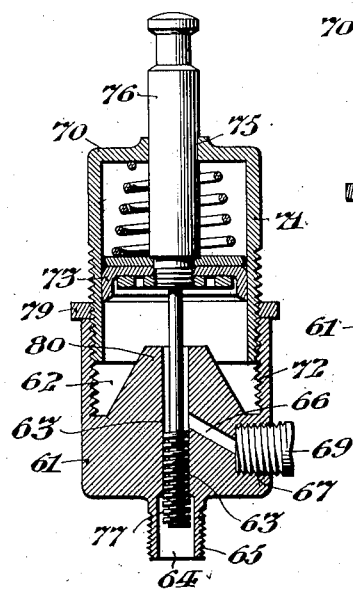
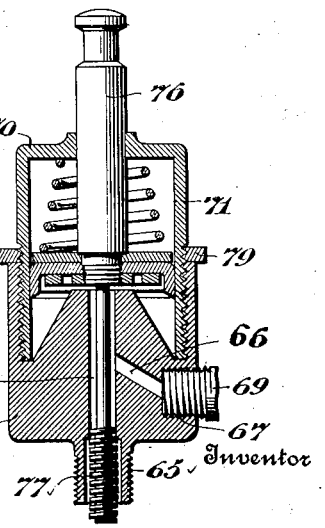
Inventor
John R. Battle,
By Clifton C. Galloway
Attorney Patented Jan. 15, 1935

1,988,152

UNITED STATES PATENT OFFICE 1,988,152

LUBRICATOR

John R. Battle, Ardmore, Pa., assignor to Gun-Fil Corporation, a corporation of Delaware Application June 26, 1929, Serial No. 373,900

4 Claims. (Cl. 184—45)

My invention relates particularly to that class of lubricators in which the lubricant contained therein is extruded therefrom by a spring-actuated piston or follower serving as a plunger arranged to be maintained under constantly effected pressure tending to compress said lubricant to force it through the outlet port, and is especially directed to means for regulating the pressure of the spring which actuates said plunger.

The principal objects of my invention are to provide a lubricator with readily accessible means conveniently adjustable to vary the pressure tending to expell the lubricant therein and consequently to vary the rate of flow of said lubricant therefrom.

Other objects of my invention are to provide a lubricator having a piston controlled valve with means adjustable to vary the capacity of the lubricant contained and consequently not only to vary the length of the piston stroke but also to vary the lead of the valve with respect to the inlet and outlet ports which it controls.

Further objects of my invention are to provide a lubricator with means for varying the relation of the valve with respect to the piston so that the lead of the valve plug with respect to the ports which it controls may be adjusted independently of the adjusted position of the plunger.

My invention contemplates such an arrangement of the associated parts that when a gang of such lubricators are connected in a central feed system with a supply reservoir under pressure they may be relatively adjusted to control the flow of lubricant to adequately supply bearings of relatively different nature, such, for instance, as bearings which are loose, short or rapid moving as distinguished from those bearings which are tight, long, or substantially still or slow moving.

Specifically stated, the form of my invention as hereinafter described comprises a container provided with inlet and outlet ports having a plunger forming a piston carrying a valve adapted to control said ports and arranged to be actuated by a spring within said container, and a cap adjustable axially on said container arranged to vary the contents of said container and to vary the dynamic effect of said spring and the consequent movement of the valve plug in the port which it controls.

My invention also includes all of the various novel features of construction and arrangement as hereinafter more definitely specified.

Figure 1:
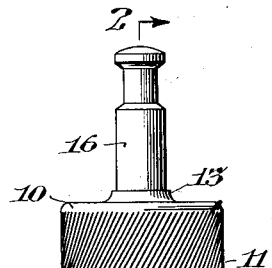
Figure 2:
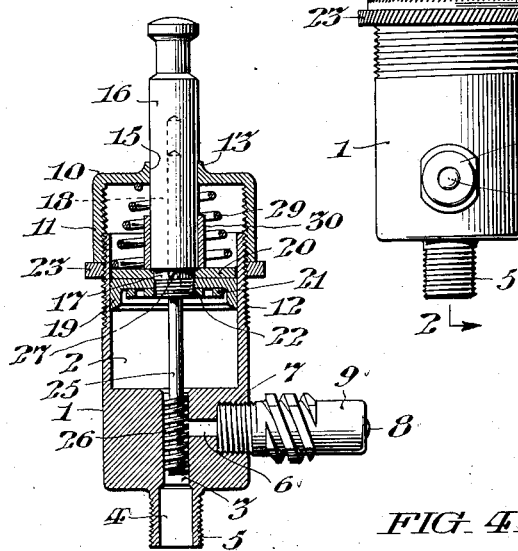
Figure 3:
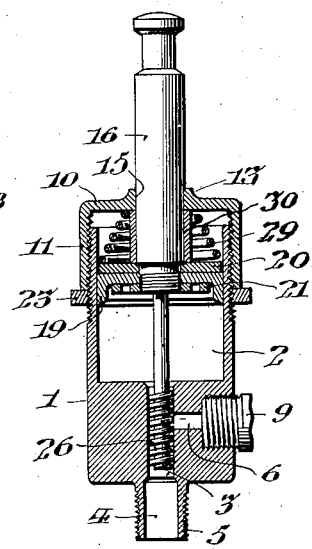
Figure 5:
Figure 4:
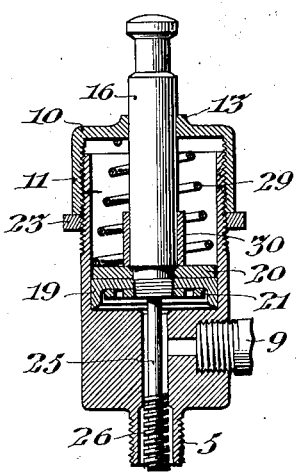
Figure 9:
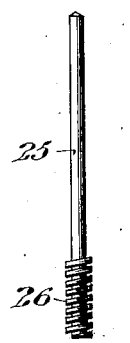
Figure 6:
Figure 7:
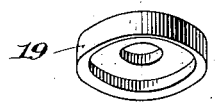
Figure 8:

In the accompanying drawings, Figure 1 is a side elevational view of a lubricator constructed in accordance with my invention; Fig. 2 is a central vertical longitudinal sectional view of the lubricator shown in Fig. 1 taken on the line 2—2 in said figure, the cap of the lubricator shown in Figures 1 and 2 being disposed in its uppermost position; Fig. 3 is a central vertical longitudinal sectional view similar to view 2 but showing the cap adjusted downwardly to decrease the capacity of the container and to also increase the dynamic effect of the piston-actuating spring; Fig. 4 is a central vertical longitudinal sectional view similar to Fig. 3, but showing the plunger and its valve plug in their lowermost positions wherein the contents of the container has been exhausted and consequently empty; Fig. 5 is a perspective view of a spacing ring or ferrule surrounding the plunger and arranged to limit its upward movement within the container; Fig. 6 is a perspective view of the washer or follower plate which serves as a backing for the piston leather cup; Fig. 7 is a perspective view of the leather cup of the piston; Fig. 8 is a perspective view of a spanner nut which is arranged to support the leather cup of the piston against the backing plate or washer shown in Fig. 6; Fig. 9 is a side elevational view of the valve-plug and its stem which is carried by the plunger; Fig. 10 is a side elevational view of a lubricator embodying a modification of the lubricator shown in Figures 1 to 4 inclusive; Fig. 11 is a central vertical longitudinal sectional view of the lubricator as shown in Fig. 10 with the adjustable cap shown adjusted to its uppermost working position; Fig. 12 is a central vertical longitudinal sectional view of the lubricator shown in Figs. 10 and 11 but showing the cap adjusted to its lowermost working position; Fig. 13 is a side elevational view of a lubricator embodying another modification of my invention; Fig. 14 is a central vertical longitudinal sectional view of the lubricator shown in Fig. 13 showing the cap adjusted to its uppermost working position; and Fig. 15 is a central vertical longitudinal sectional view of the lubricator shown in Fig. 14 showing the cap adjusted to its lowermost working position.

In said figures the lubricator body or container 1 includes the chamber 2, outlet port 3 having the broadened mouth 4 in the threaded nipple 5 by which the lubricator is attached to a bearing to be lubricated and the inlet port 6, which connects the port 3 with the threaded socket 7 in which the intake fitting 9 is engaged.

The intake fitting 9 may be of any desired and well known construction by which a lubricant filling gun or other fitting may be connected with the lubricator for the purpose of filling the chamber 2 with lubricant and may be provided with the usual check valve 8 to prevent the escape of lubricant from the chamber 2 when the filling gun is withdrawn.

The lubricator body or container 1 is provided with the closure cap 10 having the internally threaded flange 11 arranged to engage the screw threads 12 exteriorly disposed adjacent the free open end of the lubricator body 1 and extending for a considerable distance toward or approximately to the medial region of the lubricator body or container 1, such closure being provided with the boss 13 surrounding a central aperture 15 through which the plunger 16 carrying the piston structure is arranged to reciprocate.

Said plunger 16 may be of any convenient form, being shown cylindrical in the illustrations and has the reduced inner end 17 upon which is mounted the piston structure comprising the inverted cupped leather 19 disposed between the follower plate 20 and the spanner nut 21 which is internally threaded to engage the threads 22 and the reduced inner end of the plunger 16.

The flange 11 of the closure cap 10 is of considerable length and is internally threaded to engage the threads 12 on the lubricator body or container so as to provide for a wide range of adjustment of the cap 10 on said container whereby the cubical contents of the lubricator may have a wide range of variation and the dynamic effect of the spring may be similarly varied.

Said cap 10 is arranged to be held in its adjusted position on the lubricator body or container 1 by the jam-nut 23, which is arranged to be independently rotated to jam the edge of the flange 11 of the cap 10 and hold it in adjusted position on the lubricator body or container 1.

The plunger 16 is provided with an axial bore 18 into which the stem 25 of the valve plug 26 is adjustably slipped and may be secured by the set-screw 27, as shown in Fig. 2. Said valve-plug 26 may be of any desired form to restrict the flow of lubricant through the outlet port 3 and to control the flow of lubricant entering through the inlet port 6, the valve-plug 26 hereinafter shown, however, being formed of square threads providing a helical passageway between the threads and the bore of the outlet port 3 through which the lubricant is forced by the piston structure which is actuated by the spring 29, preferably of conical formation, and the dynamic effect of which may be varied by the adjustment of the closure cap 10 upon the lubricator body or container 1.

As will be obvious, when the closure cap 10 is adjusted to its uppermost position, such as shown in Fig. 2, the piston structure must be limited in its upper movement to prevent the cupped leather 19 from riding above the upper edge of the lubricator body 1, and therefore the sleeve 30 is provided surrounding the plunger 16 and serving as a spacer for limiting the upper or retracted movement of the piston structure. This spacer is removable and replaceable and obviously may be replaced by spacers of different lengths to vary the amount of compression of the spring 29, and is readily slipped over the stem 16 when the cup 10 is removed.

The lubricator shown in Figs. 10, 11 and 12 comprises the body 31 having the outlet port 33 provided with the broadened mouth 34 in the threaded nipple 35 by which the lubricator is attached to a bearing to be lubricated, and has the inlet port 36 which connects the port 33 with the threaded socket 37 in which the intake fitting 39 is engaged.

The lubricator body 31 is provided with the closure cap 40 having the internally threaded flange 41 arranged to engage the screw threads 42 exteriorly disposed upon the lubricator body 31, such closure providing the chamber 32 arranged to contain lubricant having the central aperture 45 through which the plunger 46 carrying the piston structure 43 is arranged to reciprocate, said piston structure 43 being similar to the piston structure shown in Figs. 2, 5, 6, 7 and 8 inclusive.

The plunger 46 also carries the valve plug 56 whose stem 55 may be adjustably engaged therewith and movable with the piston to vary the length of the outlet passageway or port 33 through which the lubricant may be forced in accordance with the position of the piston and the consequent gradual reducing force of the spring 59 within the cap 40, which may be adjusted up and down on the lubricator body 31 and secured in any adjusted position by the jam-nut 53. In this form of my invention, the piston structure 43 may be limited by the spacing sleeve 60 or said sleeve may be omitted as desired.

The form of lubricator shown in Figs. 13, 14 and 15 comprises a lubricator body or container 61, and includes the chamber 62, outlet port 63 and the broadened mouth 64 in the threaded nipple 65 through which the lubricator may be attached to a bearing to be lubricated. Said outlet port 63 is connected by the inlet port 66 with the threaded socket 67 to which the fitting 69 is engaged.

The lubricator body or container 61 is provided with the closure cap 70 having the externally threaded flange 71 arranged to engage the screw threads 72 internally disposed adjacent to the free open end of the lubricator body 61 and extending to the bottom of the chamber 62, such closure being provided with the aperture 75 through which the plunger 76, carrying the piston structure 73 and the valve plug 77 is arranged to reciprocate, the lubricator body 61 and cap 70 being readily secured in adjusted position by the jam-nut 79. In this form of my invention, the floor of the lubricator body 61 comprises a conical projection 80 which serves as an abutment for the piston structure 73 so as to prevent it from riding below the lower edge of the flange 71 of the closure cap 70.

My invention is particularly advantageous in that where a number of such lubricators are connected to a central feed system to lubricate different bearings wherein the bearing conditions differ one from the other and require more or less lubricant or force to feed the lubricant, such as loose or tight bearings or slow or rapid moving bearings, it being obvious that the cap of the lubricator may be adjusted to cause greater or less pressure of the actuating spring upon the piston which forces the lubricant from the lubricator. Furthermore, the contents of the lubricant container may be also varied in accordance with the consistency of the lubricant; for instance, if said lubricant is light, soft or fluffy in character, the capacity of said container may be increased accordingly, and with said increase in capacity of the container, the valve is automatically adjusted to control the flow of said lubricant through the outlet port.

Having thus described my invention, I claim:
1. A lubricator comprising a lubricant container having inlet and outlet ports, a plunger mounted for reciprocation in said container by which lubricant may be forced through said outlet port, a port controlling valve carried by said plunger, and arranged to control both said inlet and outlet ports, means tending to actuate said plunger, means adjustable to vary the dynamic effect of said plunger actuating means, and a sleeve carried by said plunger slidable over said stem and serving as a spacer arranged to limit the retracted movement of said plunger.

2. A lubricator comprising a lubricant container having inlet and outlet ports, a plunger mounted for reciprocation in said container by which lubricant may be forced through said outlet port, a port controlling valve carried by said plunger, and arranged to control both said inlet and outlet ports, means tending to actuate said plunger, means adjustable to vary the dynamic effect of said plunger actuating means, and spacing means cooperative with said adjustable means serving to limit the retracted movement of said plunger.

3. A lubricator comprising a lubricant container having a valve chamber provided with an outlet port and an inlet port in direct communication with said outlet port, a plunger in said container by which lubricant may be forced through said outlet port from said container, a port controlling valve axially movable in said outlet port and extending across the orifice of said inlet port and arranged to control the flow of lubricant through both said outlet and inlet ports, and means whereby the relation between said plunger and valve may be variably adjusted to vary the lead of said valve with respect to the inlet port.

4. A lubricator comprising a lubricant container having a valve chamber provided with relatively intersecting inlet and outlet ports, a plunger in said container by which lubricant may be forced through said outlet port, a port controlling valve mounted to reciprocate in said outlet port and across the orifice of said inlet port and arranged to control the flow of lubricant through both said outlet and inlet ports, means whereby said valve may be secured to said plunger at relatively different distances therefrom to vary the lead of said valve with respect to the inlet port, and means adjustable to vary the force tending to actuate said plunger.

JOHN R. BATTLE.